United States Patent [19]
Roberts et al.

[11] Patent Number: 5,994,417
[45] Date of Patent: Nov. 30, 1999

[54] PROCESS FOR RECOVERING POLYMERS FROM COMMINGLED MATERIALS

[75] Inventors: Christopher B. Roberts, Auburn; Aron T. Griffith, Opelika, both of Ala.

[73] Assignee: Auburn University, Ala.

[21] Appl. No.: 08/869,050

[22] Filed: Jun. 4, 1997

Related U.S. Application Data

[60] Provisional application No. 60/018,920, Jun. 4, 1996.

[51] Int. Cl.$^6$ .................................................. C08J 11/04
[52] U.S. Cl. ........................................ 521/49.8; 521/47
[58] Field of Search ........................... 521/40, 46.5, 47, 521/49.8; 528/493, 496, 491, 486

[56] References Cited

U.S. PATENT DOCUMENTS

| | | | |
|---|---|---|---|
| 3,923,738 | 12/1975 | Van Sorge | 528/496 |
| 3,987,015 | 10/1976 | Driscoll | 528/487 |
| 4,071,479 | 1/1978 | Broyde | 521/46.5 |
| 4,182,850 | 1/1980 | Marshall | 528/491 |
| 4,414,386 | 11/1983 | Lane | 528/496 |
| 4,563,517 | 1/1986 | Watson | 528/496 |
| 4,609,724 | 9/1986 | Elefritz | 528/497 |
| 4,668,768 | 5/1987 | Mendiratta | 528/493 |
| 5,264,553 | 11/1993 | Hou | 528/486 |
| 5,270,445 | 12/1993 | Hou | 528/486 |

*Primary Examiner*—Paul R. Mitchl
*Attorney, Agent, or Firm*—Dority & Manning, P.A.

[57] ABSTRACT

A process for recovering polymers from commingled materials is disclosed. In general, the process includes first contacting the commingled materials with a solvent which selectively dissolves the polymer to form a solvent and polymer solution. The solvent and polymer solution is then contacted with an anti-solvent into which the solvent is soluble but into which the polymer is insoluble. When the solvent and polymer solution is contacted with the anti-solvent, the anti-solvent causes the polymer to nucleate and precipitate from the solution. In one embodiment, it has been found that the process of the present invention is particularly well adapted to recovering nylon from commingled materials such as carpet waste.

23 Claims, 1 Drawing Sheet

PROCESS FOR RECOVERING POLYMERS FROM COMMINGLED MATERIALS

The present application is based on a Provisional Application filed Jun. 4, 1996 and having U.S. Ser. No. 60/018,920.

FIELD OF THE INVENTION

The present invention generally relates to a process for recovering polymers from commingled materials and is more particularly directed to a process for separating and recovering polymers such as polyamides, polystyrenes and polyolefins from waste materials, such as carpeting.

BACKGROUND OF THE INVENTION

Since their initial development, the demand for plastics and polymers has continued to increase by leaps and bounds. For instance, in 1989 fifty-eight (58) billion pounds of plastics were manufactured for sale and use in the United States alone. In fact, it is projected that the demand for plastics will reach 76 billion pounds by the turn of the century.

With the continued increase in production and use of plastics, recent focus has turned to processes for recycling the plastics after they have been used for two important reasons. First, manufacturing plastics and polymers requires the use of precious natural resources which are lost if the polymers and plastics are subsequently disposed of.

Another important reason to recycle plastics is the fact that plastics and polymers are virtually non-biodegradable. Consequently, if plastics are disposed of into the environment by, for instance, being placed into a landfill, the plastics will not be broken down by soil organisms, but instead will physically and chemically degrade and slowly release their chemical contents into the soil. Besides taking up valuable landfill space, the environmental concerns associated with waste plastics has prompted a need for further development of polymer recycling strategies.

In order to effectively recycle most polymeric materials, however, the polymers must be separated and isolated from other materials with which they are typically found. For instance, products made with plastics often contain other materials, such as wood, paper, metals, glass, other polymers and various other materials. Unfortunately, once the polymers are commingled with other materials, recycling becomes significantly more complex and oftentimes becomes more expensive than landfill disposal and production of new products from virgin materials. Clearly, a need exists for an economical process adapted to recycle polymers contained in a mixture of different materials.

In the past, others have attempted to separate components from a multi-component system. For instance, in U.S. Pat. No. 4,714,526 to Pennisi, et al. a supercritical fluid extraction method for multi-component systems is disclosed. Pennisi et al., which is incorporated in its entirety by reference into the present application, is directed to a process for extracting pure components from a multi-component system by effecting a change in temperature at a pressure between the cross-over pressure points of the various components of the system.

U.S. Pat. No. 5,233,021 to Sikorski, which is also incorporated in its entirety by reference into the present application, is directed to recycling polymeric materials from carpets and other multi-component structures by means of supercritical fluid extraction. In Sikorski, the method includes extracting pure components from a multi-component structure by dissolving each component at an appropriate temperature and pressure in a super-critical fluid and then varying the temperature and/or pressure to extract particular components in sequence.

Various objects, features and advantages of the present invention, however, remain absent from the prior art as will be made apparent from the following detailed description.

SUMMARY OF THE INVENTION

The present invention is directed to further improvements in processes for separating and recycling a polymer when it is initially contained in a mixture of commingled materials. As used herein, commingled materials refers to materials that are physically combined.

Accordingly, it is an object of the present invention to provide an improved process for recycling polymers.

Another object of the present invention is to provide an improved process for separating polymers, such as polyamides, polystyrenes, and polyolefins from commingled materials.

It is another object of the present invention to provide a process for separating nylon from other materials.

Still another object of the present invention is to provide a process for separating and recycling nylon, such as nylon-6 and nylon-6,6, contained in waste carpet materials.

These and other objects of the present invention are achieved by providing a process for separating a polymer from other materials including the steps of providing a mixture of commingled materials containing a polymer. The commingled materials are combined with a solvent that selectively dissolves the desired polymer to form a solution without dissolving substantial amounts of the other materials or polymers. The solution is then contacted with an anti-solvent. The anti-solvent is selected from a group consisting of compressed fluids into which the solvent is soluble but the desired polymer is not. When contacted with the solution, the anti-solvent (non-solvent) induces precipitation of the polymer from the solvent.

After the polymer is precipitated and separated from the solvent and anti-solvent solution, the process can further include the step of separating the solvent from the anti-solvent. For instance, the anti-solvent can be a fluid at or near its critical temperature and pressure. By adjusting the temperature and/or the pressure therefore reducing the density and the solvent strength of the mixture, the solvent may become insoluble in the anti-solvent creating two separate phases which are easily separable. Once the solvent and anti-solvent are separated, both may be reused and recycled into the process of the present invention.

In one exemplary embodiment, the present invention is directed to a process for separating nylon from other materials comprising the steps of first providing a mixture of commingled materials containing nylon. The mixture of commingled materials can be contacted with a solvent. The solvent selectively dissolves the nylon to form a solvent and nylon solution without dissolving appreciable amounts of the other materials contained in the mixture. The solvent is added to the mixture in an amount sufficient to dissolve substantially all of the nylon.

The solvent and nylon solution is then contacted with an anti-solvent. The solvent is soluble within the anti-solvent. The properties of the anti-solvent are chosen such that the polymer, on the other hand, is insoluble in the anti-solvent, therefore, the polymer precipitates from the solution.

The solvent can be, for instance, formic acid, acetic acid, or phenol. The anti-solvent, on the other hand, can be carbon dioxide at a temperature and pressure into which the solvent is soluble but the nylon is not. For instance, the carbon dioxide can have a temperature such that the carbon dioxide is maintained as a liquid or maintained in its critical state. In one embodiment, the carbon dioxide has a temperature of from about 25° C. to about 50° C. and can be at a pressure of at least 73 bar.

When using carbon dioxide, the solvent and nylon solution is preferably sprayed into a pressurized chamber containing the carbon dioxide.

The process can further include the step of separating the solvent and the anti-solvent from the precipitated nylon. Also, once the nylon is precipitated, the solvent and the anti-solvent can then be separated from each other. When the anti-solvent is carbon dioxide, the temperature and/or pressure of the carbon dioxide can be adjusted affecting the density and solvent strength of the carbon dioxide in a manner such that the solvent is no longer soluble in the carbon dioxide. Both the solvent and the anti-solvent can then be easily separated and reused into the process.

In one preferred embodiment of the present invention, the process is used to separate nylon from waste carpet materials. The majority of the components in carpet typically include a nylon facing, a polypropylene backing layer or layers, and a latex binding. According to the process of the present invention, the carpet materials can be combined with a solvent such as formic acid, acetic acid or phenol in an amount sufficient to dissolve all of the nylon within the carpet.

The nylon and solvent solution can then be separated from the remainder of the carpet materials and injected into a pressurized chamber containing carbon dioxide. The carbon dioxide can be at a temperature and pressure into which the phenol, acetic acid or formic acid is soluble but the nylon is insoluble. Under these conditions, when the nylon solution is contacted with the carbon dioxide, the nylon precipitates from the solution. The nylon is thus easily separable from the carbon dioxide and solvent solution and can be reused as desired.

After the nylon is precipitated and recovered, the temperature and pressure of the carbon dioxide and solvent solution can be adjusted in a manner making the formic acid or phenol insoluble within the carbon dioxide. The carbon dioxide and solvent can thus be separated and reused in the process, forming a continuous cycle.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying FIGURE, in which a graphical illustration of one embodiment of the process of the present invention is shown.

DETAILED DESCRIPTION OF THE PREFERRED EMBODIMENT

Figure 1:
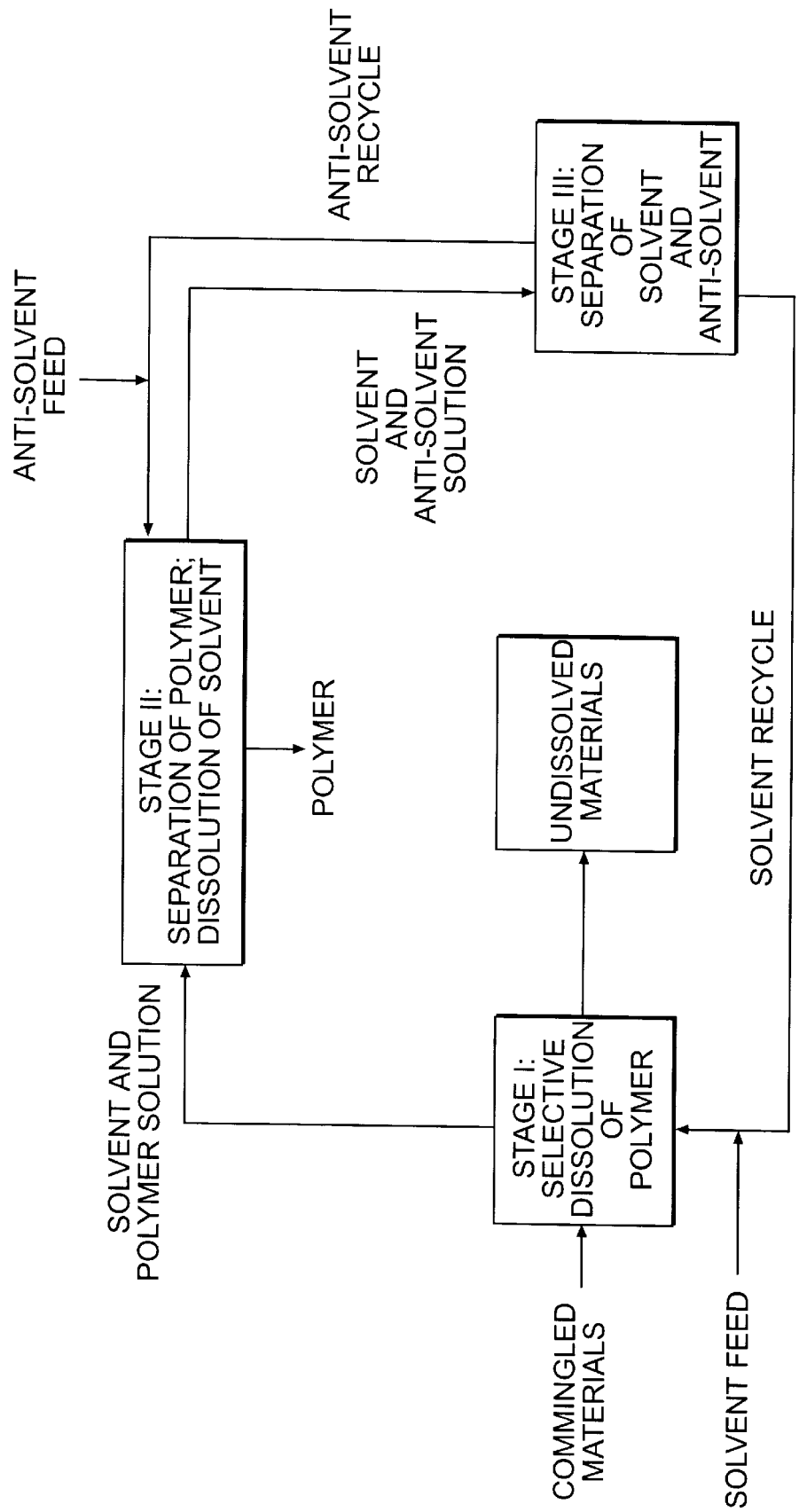

It is to be understood by one of ordinary skill in the art that the present discussion is a description of exemplary embodiments only, and is not intended as limiting the broader aspects of the present invention, which broader aspects are embodied in the exemplary constructions.

The present invention is generally directed to a new environmentally benign process for the recovery of individual polymeric components, such as polyamides, polyolefins and polystyrene, from commingled polymeric components, such as carpeting and packaging materials. The process involves preferentially dissolving one polymeric component, for instance nylon, into a liquid solvent, such as formic acid or phenol, to form a solution. The solution is then combined with an anti-solvent, such as carbon dioxide, which causes recrystallization of the polymer. The process can be operated using low temperature solvents to reduce costs and can use carbon dioxide, as opposed to using conventional hazardous organic anti-solvents. Further, the solvent and anti-solvent used in the process can subsequently be separated after recrystallization of the polymer for reuse in a "closed loop" system.

During the process, the particle size and morphology of the recrystallized polymer can be controlled and varied by adjusting process parameters. For instance, the process can be used to produce a porous product, a non-porous product, a spherical product, a fiber-like product, and particles of various sizes as desired.

It has been found that the process of the present invention is particularly well suited to recycling polymers contained in textile products. For instance, the process can be used to separate nylon, such as nylon-6 and nylon-6,6, from waste carpet materials. Also, it is believed that the process is well suited to recycling polymers contained in bottling and packaging materials, manufactured parts, clothing, municipal plastic wastes, wood and paper products, besides other various materials.

Referring to the FIGURE, one particular embodiment of the process of the present invention is illustrated. As shown in Stage I, commingled materials containing a polymer are combined with a liquid solvent. The polymer is soluble in the solvent, while the remainder of the commingled materials are not soluble to a significant amount. Thus, the polymer dissolves into the solvent, leaving most of the remainder of the materials behind.

After removing any undissolved components, the solvent and polymer solution is then combined with an anti-solvent at Stage II of the process. As used herein, an anti-solvent refers to a fluid into which the solvent is miscible and soluble but into which the polymer is not soluble. When the solvent and polymer solution is combined with the anti-solvent, the solvent dissolves into the anti-solvent inducing the polymer to nucleate and ultimately precipitate from the solution. Once precipitated, the polymer is easily separable from the solvent and anti-solvent solution.

As shown on the diagram, at Stage III of the process, the solvent and anti-solvent are separated. The solvent is recycled back to Stage I of the process while the anti-solvent is recycled back to Stage II of the process. Thus, complete recycle and reuse of the solvent and the anti-solvent is possible. Through the process of the present invention, little or no environmentally hazardous substances are introduced into the environment and no disposal is necessary.

The process of the present invention will now be described in more complete detail with reference to the recovery of polyamides and in particular nylon from commingled materials, such as carpet waste. Carpet is primarily made containing a polypropylene backing, a nylon facing, and a latex binding as well as other minor components. Through the process of the present invention, the nylon can be separated from the rest of the materials contained in the carpeting. Of course, many other commingled materials containing nylon can be used in the process of the present invention. For instance, the present invention can also be used to separate nylon linings from packaging materials.

In processing carpeting, the carpet materials can first be sized to a particular dimension. Sizing the carpet materials facilitates later mixing with the solvent and also facilitates handling of the materials through the process.

Once sized, the carpet materials are combined with a solvent that selectively dissolves the nylon contained within the carpeting but does not dissolve a substantial amount of the other materials, such as the polypropylene or the latex binding. Thus far, solvents that have been found to be suitable for use in the process of the present invention include formic acid, phenol and acetic acid. It is believed that some stronger acids, such as hydrochloric acid or sulphuric acid, may also be used in the process.

When added to the carpet materials, the solvent should be in a fluid phase. The temperature at which the solvent and the carpet materials are combined is generally not critical. When using formic acid or phenol as the solvent, the materials can be combined at room temperature. Acetic acid, however, may require slightly higher temperatures. Temperatures can be increased to decrease the time it takes for the nylon to dissolve and to increase the maximum solubility of nylon in the solvent.

Most commercially available phenol or formic acid reagents contain small amounts of water. For instance, known commercially available reagents include an 88 weight percent formic acid solution and a 92 weight percent phenol solution. Both of these reagents may be used in the process of the present invention. When water is present in the solvent, however, the polymer that is subsequently recovered from the process may need to be dried.

The solvent can be added to the carpet materials in an amount sufficient to create an extremely dilute solution or a very saturated solution. Generally, for economic reasons, it is preferred to add the solvent in an amount sufficient to dissolve all of the nylon and to produce a near saturated solution. Higher concentration solutions will also lead to recovering larger sized polymer particles as will be discussed in more detail below.

When using formic acid as the solvent, after being combined with the carpet materials the solvent and nylon solution can have a nylon concentration of up to about 25%.

After the nylon is dissolved in the solvent, the resulting solvent and nylon solution can be easily separated from the remainder of the solid carpet materials, such as by filtration. According to the process of the present invention, the solvent and nylon solution is then contacted with an anti-solvent, which is a fluid into which the solvent is miscible or soluble but into which the nylon is insoluble. When the solvent and nylon solution is contacted with the anti-solvent, the solvent diffuses into the anti-solvent inducing the nylon to precipitate from the solution. The solvent and anti-solvent, which form a single phase solution, can then be easily separated from the precipitated nylon.

In general, anti-solvents suitable for use in the present invention are liquids or fluids at or near their critical temperature and pressure. A fluid at or near its critical temperature and pressure, such as a supercritical fluid, is a fluid that has properties intermediate between that of a liquid and a gas. Such a fluid affords the opportunity to manipulate the physical properties between that of a liquid and a gas with simple perturbations in temperature and pressure.

Fluids that may be used as anti-solvents in the present invention include most compressible fluids into which the polymer, such as nylon, is insoluble. For instance, in one embodiment the anti-solvent can include a hydrocarbon gas, such as ethane or propane.

In one preferred embodiment, the anti-solvent used in the present invention is carbon dioxide maintained at a temperature and pressure to remain a liquid or maintained near or above its critical temperature and pressure, which is 31° C. and 73 bar, respectively. Using carbon dioxide in the process of the present invention offers many advantages. Carbon dioxide is relatively inexpensive and has a relatively low critical temperature and pressure. Further, carbon dioxide is environmentally benign in comparison to typical organic solvents.

The temperature and pressure range within which the carbon dioxide must exist in order for the solvent to be soluble in the carbon dioxide is dependent upon a number of factors. Several factors include the amount of solvent present in relation to the carbon dioxide, the rate and pressure at which the solvent is introduced into the carbon dioxide, and the temperature and pressure of the carbon dioxide. When using formic acid as the solvent, it has been found that the carbon dioxide can be at or near its critical temperature and pressure in order for the formic acid to be soluble in the carbon dioxide, while the nylon remains insoluble in the carbon dioxide.

In general, the temperature of the carbon dioxide can be from about 25° C. to about 50° C. and can be at a pressure from about 60 bar to over 300 bar. Even higher pressures may be used if desired. It should be understood that the temperature and pressure of the carbon dioxide can be widely varied depending upon the particular application and the particular result desired. The above listed temperatures and pressures are thus merely exemplary for some applications. Substantially increased temperatures, however, may cause the nylon to also dissolve into the carbon dioxide. In one preferred embodiment, the carbon dioxide can be at a temperature of approximately 40° C. and at a pressure of less than about 100 bar.

When contacting the solvent and nylon solution with the carbon dioxide, in one embodiment the solvent and nylon solution can be placed into a pressurized chamber containing the carbon dioxide. If the carbon dioxide contained within the chamber is at a temperature above room temperature, the solvent and polymer solution can be preheated prior to entering the chamber. More particularly, the solvent and nylon solution can be preheated just prior to being entered into the chamber or during mixing of the solvent with the carpet materials. Heating the solvent when it is mixed with the carpet materials possibly increases the solubility limit of the nylon in the solvent.

Regardless, when the solvent and nylon solution is contacted with the anti-solvent in the chamber, precipitation occurs. As the solvent dissolves into the carbon dioxide, the nylon precipitates from the solvent forming a solid precipitant within the chamber.

In order to separate the precipitated nylon from the solvent/anti-solvent solution, the chamber can either be flushed with pure carbon dioxide to remove the solvent and subsequently depressurized or a recovery unit can be connected to the chamber to remove the solid particles from the pressurized chamber.

A particular advantage of the process of the present invention is the ability to manipulate the size and morphology of the recovered nylon particles. For instance, many possible factors can be adjusted in order to alter the characteristics of the final product. Three factors include (1) the surface tension of the droplets sprayed into the chamber containing the carbon dioxide, which relates to the size of the droplets created, (2) the concentration of the nylon contained in the solvent, and (3) the velocity of the solvent and polymer solution as it is injected into the chamber. By manipulating the above three variables, nylon particles can be produced that are either porous or non-porous, spherical or fiber-like in shape, and that have small or larger sizes. The nylon can also be formed into a film. The above three factors can also be used to produce agglomerated nylon particles. For instance, it is believed that nylon particles can be recovered from the process having a size ranging from about 0.1 to about 100 microns. Depending upon the conditions, the nylon particles can be in the shape of hollow and porous spheres or can be recovered as fiber-like particles.

Since nylon particles having different characteristics can be used for different applications, one object of the present invention is to tailor the process to produce a uniform nylon product having desired characteristics.

After the nylon particles have been separated from the solvent and anti-solvent fluid, the solvent and anti-solvent can be separated and reused in the process. For instance, when using carbon dioxide as the anti-solvent, the solvent and anti-solvent solution can be sent to a separation chamber in which the density of the solution is varied causing the two fluids to separate. Specifically, by adjusting the temperature and pressure of the carbon dioxide and solvent solution to conditions below the cloud point of the mixture, a phase separation occurs. As used herein, the cloud point refers to the solubility limit of the solvent and the anti-solvent or, in other words, the point where the solvent becomes insoluble in the anti-solvent. The resulting two phases include a solvent rich phase and an anti-solvent rich phase. The extent of separation will be effected by the amount of change in temperature and pressure.

The cloud point of the solvent/carbon dioxide mixture depends on the concentration of the solvent contained within the carbon dioxide. For instance, when using formic acid as the solvent, it has been found that the cloud temperature and pressure of a 2.3 mole percent formic acid solution and carbon dioxide is approximately a temperature of about 34° C. and at a pressure of 77.2 bar. When the mole percent of formic acid is increased to 3.67%, the cloud point has been found to be approximately 36.5° C. and 79.6 bar. Preferably, the temperature and/or pressure is brought somewhat below the critical point of the mixture in order to have nearly complete separation of the two fluids. If the carbon dioxide is to be reused in the process, however, any temperature and pressure drop must be regained prior to being contacted with the solvent and nylon solution. In one embodiment, an expansion valve can be used to lower the pressure of the carbon dioxide and to separate the carbon dioxide from the solvent.

Once the solvent and anti-solvent are separated, both fluids can then be recycled and reused in the process of the present invention. The process of the present invention provides great improvements in plastics recycling in that it conserves natural resources, diverts more materials from landfills and produces marketable, useful products.

Besides separating polyamides, such as nylon, from commingled materials, the process of the present invention can also be used for recovering other types of polymers. For instance, polystyrene coatings which are found on paper products, can be processed and recovered similar to the above-described process for nylon. When recovering polystyrene from paper products, however, the solvent that may be used is preferably acetone or can also be, for instance, toluene.

It is believed that polyolefins can also be separated from commingled materials and recovered. Polyolefins, such as polyethylene or polypropylene, are found in a wide variety of commercial products. When recovering polyolefins, the solvent can be a hydrocarbon, such as propane, at a high temperature, such as above about 150° C.

The present invention may be better understood with reference to the following example.

EXAMPLE I

The following example was performed in order to demonstrate how nylon can be separated and recovered from waste carpet materials according to the process of the present invention.

Small carpet squares were loaded into a vessel. A reagent comprising 88% formic acid and 12% water was added to the vessel and mixed with the carpet squares. The nylon component of the carpet dissolved in the formic acid to near saturation conditions. The formic acid and nylon solution was then filtered and charged to a high pressure hand operated syringe pump at room temperature and was pressurized to 170 bar. A portion of the formic acid and nylon solution was pumped through a 150 micron nozzle into a 100 ml high pressure view cell. The high pressure view cell contained supercritical carbon dioxide at a temperature of 45° C. and at a pressure of 100 bar. Temperature was maintained within the high pressure view cell using a water bath and an immersion heater/circulator. The pressure in the view cell was monitored with a Heise 701A digital pressure gauge.

The formic acid and nylon solution broke up into a spray upon entering the high pressure view cell. As the spray traveled through the view cell, a very thin white residue was produced and collected on a glass plate placed inside the cell. A carbon dioxide and formic acid solution also formed. This solution was flushed from the high pressure view cell with two equivalent view cell volumes of carbon dioxide using an Isco 260D high pressure syringe pump. The carbon dioxide pumped into the view cell was at the same temperature and pressure as the carbon dioxide and formic acid solution in order to ensure that all of the formic acid was removed from the cell.

After the carbon dioxide and formic acid solution was flushed, the high pressure view cell was depressurized and the glass plate retrieved. The glass plate was gold sputtered and SEM analysis of the particles collected on the plate showed that porous and spherical nylon particles were formed during the experiment. The particle sizes collected ranged from 1 micron to 30 microns. X-ray and FTIR spectroscopy of the particles formed showed purity levels of greater than 99% nylon.

EXAMPLE II

The system described in Example I was used to dissolve nylon 6 and nylon 6,6 from carpet waste into an 88% formic acid solution. In this experiment, polymer solution pressure, anti-solvent pressure, and the nozzle size for injecting the polymer solution into the reactor vessel were varied to compare results.

In this Example, system temperature was maintained and controlled at 40° C. during all tests.

In one set of experiments, the pressure of the polymer solution as it entered the reactor vessel was varied between 152 bar to 275 bar. The pressure of the carbon dioxide contained in the vessel was also varied between 83 bar to 124 bar. Further, the polymer solution was injected into the reactor vessel using a 50 micron diameter nozzle, a 100 diameter nozzle, and a 154 micron diameter nozzle.

At the above pressures and nozzle sizes, spherical particles of nylon were formed.

For instance, at a polymer solution pressure of 207 bar and at a carbon dioxide pressure of 110 bar using a 154 micron nozzle, spherical particles of nylon were formed and collected having a diameter in the range of from about less than 1 micron to about 18 microns.

Multiple experiments were performed to investigate the influence of polymer solution pressure, carbon dioxide pressure, and nozzle diameter on particle size and distribution. In general, within the above pressure ranges, these parameters only had a modest influence on particle size and distribution.

Through these experiments, it was discovered, however, that as the pressure of the polymer solution was increased, the nylon particles slightly increased in size. However, most of the nylon particles formed regardless of the polymer solution pressure, mostly had a size of less than about 6 microns.

The effect of nozzle diameter also only had a slight influence on particle size distribution when the polymer solution pressure and the carbon dioxide pressure remained constant. In general, smaller diameter nozzles appear to increase the average size of the recovered nylon particles.

During the test it was also discovered that increasing carbon dioxide pressure tended to decrease the average size of the nylon particles collected. This effect, however, was modest.

In a final test, the polymer solution pressure was increased to 327 bar. During this test, the carbon dioxide was maintained at a pressure of 110 bar while a 154 micron diameter nozzle was used to inject the polymer solution into the reactor chamber.

When the polymer solution pressure was increased as stated above, instead of spheres, hollow half spheres or "cusps" of nylon were formed. The nylon particles were also very porous.

Although unknown, it is possible that half spheres or cusps formed when the pressure of the polymer solution was increased due to the increased shear that results from the increased pressure drop during expansion. Alternatively, it is also possible that as the nylon/formic acid liquid droplets spray into the carbon dioxide gas, precipitation rapidly occurs on the surface of the sprayed droplet causing production of a nylon film or skin around the liquid droplet. As the carbon dioxide continues to penetrate and swell the formed nylon shell and as the liquid solution continues to diffuse into the bulk carbon dioxide, a rupture of the nylon shell may occur.

These and other modifications and variations to the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention.

What is claimed is:

1. A process for separating a polymer from other materials comprising the steps of:

providing a mixture of commingled materials containing a polymer, said polymer comprising a polyamide;

combining said materials with a solvent, said solvent selectively dissolving said polymer to form a solution without dissolving substantial amounts of the other materials;

separating said solvent and polymer solution from said other undissolved materials; and contacting said solution with an anti-solvent, said anti-solvent being selected from the group consisting of fluids into which said solvent is soluble but said polymer is insoluble, said anti-solvent comprising a compressed fluid, near, at or above its critical pressure, said anti-solvent causing said polymer to precipitate from said solvent.

2. A process as defined in claim 1, wherein said polymer comprises nylon.

3. A process as defined in claim 2, wherein said solvent comprises a material selected from the group consisting of formic acid, phenol, acetic acid, and mixtures thereof.

4. A process as defined in claim 1, wherein said anti-solvent comprises a fluid near or above its critical temperature and pressure.

5. A process as defined in claim 1, wherein said anti-solvent comprises carbon dioxide.

6. A process as defined in claim 1, wherein said solvent comprises a material selected from the group consisting of formic acid, phenol and acidic acid, and said anti-solvent comprises carbon dioxide.

7. A process as defined in claim 1, further comprising the steps of:

separating said solvent and said anti-solvent from said precipitated polymer; and thereafter separating said solvent from said anti-solvent by adjusting the temperature and pressure of said anti-solvent such that said solvent is no longer soluble in said anti-solvent.

8. A process as defined in claim 1, wherein said solvent and polymer solution is contacted with said anti-solvent in a pressurized chamber.

9. A process as defined in claim 8, wherein said solvent and polymer solution is sprayed into said pressurized chamber.

10. A process for separating nylon from other materials comprising the steps of:

providing a mixture of commingled materials, said mixture containing nylon;

contacting said mixture with a solvent, said solvent selectively dissolving said nylon to form a solvent and nylon solution without substantially dissolving any of the other materials contained in said mixture, said solvent being added in an amount sufficient to dissolve substantially all of said nylon contained in said mixture;

separating said solvent and nylon solution from said other undissolved materials; and contacting said solvent and nylon solution with an anti-solvent, said solvent being soluble within said anti-solvent while said nylon is insoluble in said anti-solvent, said anti-solvent comprising a material selected from the group consisting of ethane, propane and carbon dioxide, said anti-solvent being added to said solvent and nylon solution in an amount sufficient to cause said nylon to nucleate and to precipitate from said solvent.

11. The process as defined in claim 10, wherein said solvent comprises a material selected from the group consisting of formic acid, phenol, acetic acid, and mixtures thereof.

12. A process as defined in claim 10, wherein said anti-solvent comprises a compressed fluid near or above its critical temperature and pressure.

13. A process as defined in claim 12, wherein said anti-solvent comprises carbon dioxide.

14. A process as defined in claim 10, further comprising the steps of:

separating said solvent and said anti-solvent from said precipitated nylon; and thereafter separating said solvent from said anti-solvent by adjusting the temperature and pressure of said anti-solvent such that said solvent is no longer soluble in said anti-solvent.

15. A process as defined in claim 10, wherein said solvent and nylon solution is contacted with said anti-solvent by spraying said solvent and nylon solution into a pressurized chamber containing said anti-solvent.

16. A process as defined in claim 15, wherein said anti-solvent comprises carbon dioxide at a temperature of at least 25° C. and a pressure of at least 73 bar.

17. A process as defined in claim 16, wherein said carbon dioxide is at a pressure of at least 100 bar.

18. A process as defined in claim 10, wherein said solvent comprises formic acid and said anti-solvent comprises carbon dioxide.

19. A process for separating nylon from other materials comprising the steps of:

providing a mixture of commingled materials, said mixture containing nylon;

contacting said mixture with a solvent, said solvent selectively dissolving said nylon to form a solvent and nylon solution without substantially dissolving any of the other materials contained in said mixture, said solvent comprising a material selected from the group consisting of formic acid, phenol, acetic acid and mixtures thereof;

separating said solvent and nylon solution from the remainder of said mixture; and contacting said solvent and nylon solution with an anti-solvent, said solvent being soluble within said anti-solvent while said nylon is insoluble in said anti-solvent, said anti-solvent comprising carbon dioxide, said anti-solvent causing said nylon to nucleate and precipitate from said solvent.

20. A process as defined in claim 19, wherein said solvent comprises formic acid.

21. A process as defined in claim 19, wherein said carbon dioxide is near or above its critical temperature and pressure.

22. A process as defined in claim 19, wherein said solvent and nylon solution is contacted with said anti-solvent in a pressurized chamber.

23. A process as defined in claim 21, wherein said carbon dioxide is at a temperature of at least 25° C. and a pressure of at least 73 bar.

* * * * *

UNITED STATES PATENT AND TRADEMARK OFFICE
CERTIFICATE OF CORRECTION

PATENT NO.        : 5,994,417
APPLICATION NO. : 08/869050
DATED             : November 30, 1999
INVENTOR(S)       : Christopher B. Roberts and Aron T. Griffith Page 1 of 1

It is certified that error appears in the above-identified patent and that said Letters Patent is hereby corrected as shown below:

IN THE SPECIFICATION

Column 1, line 7, add -- The U.S. Government has a paid-up license in this invention and the right in limited circumstances to require the patent owner to license others on reasonable terms as provided for by the terms of Contract/Grant No. 9550480 awarded by the National Science Foundation (NSF)/EPSCoR.--

Signed and Sealed this

Twenty-first Day of August, 2007

JON W. DUDAS
*Director of the United States Patent and Trademark Office*